United States Patent [19]
Youtsey et al.

[11] 3,916,066
[45] *Oct. 28, 1975

[54] CONDUCTING MATERIAL FOR CONDUCTING DEVICES AND METHOD FOR FORMING THE SAME

[75] Inventors: Karl J. Youtsey, Chicago; William C. Holt, Jr., Prospect Heights; Robert D. Carnahan, Barrington; David H. Spielberg, Schaumburg, all of Ill.

[73] Assignee: Universal Oil Products Company, Des Plaines, Ill.

[ * ] Notice: The portion of the term of this patent subsequent to Mar. 21, 1989, has been disclaimed.

[22] Filed: Aug. 16, 1973

[21] Appl. No.: 389,050

Related U.S. Application Data

[63] Continuation-in-part of Ser. No. 226,035, Feb. 14, 1972, which is a continuation-in-part of Ser. No. 66,521, Aug. 21, 1970, Pat. No. 3,651,386.

[52] U.S. Cl. .............. 428/409; 252/62.3 Q; 357/8; 357/23; 427/58; 427/86; 427/2 SS
[51] Int. Cl.$^2$ .................. H01C 17/20; H01L 29/28
[58] Field of Search ....... 252/62.3 Q; 117/216, 218, 117/226; 310/251, 252, 253; 317/235 AF; 357/8, 61, 23

[56] References Cited
UNITED STATES PATENTS

| | | | |
|---|---|---|---|
| 3,039,897 | 6/1962 | Waring et al. | 117/226 |
| 3,274,034 | 9/1966 | Frant et al. | 148/33 |
| 3,281,394 | 10/1966 | Katon | 317/235 |
| 3,649,565 | 3/1972 | Wilhelm | 252/466 PT |
| 3,649,566 | 3/1972 | Hayes et al. | 252/466 PT |
| 3,652,697 | 3/1972 | Hayes | 252/466 PT |

OTHER PUBLICATIONS

Pohl, "Semiconduction in Polymers," Organic Semiconductors, Brophy et al., Eds, (MacMillan, N.Y.) 1962, pp. 134–138.

Primary Examiner—William D. Larkins
Attorney, Agent, or Firm—James R. Hoatson, Jr.; Raymond H. Nelson; William H. Page, II

[57] ABSTRACT

Electrically conductive material for conducting devices comprises a refractory inorganic oxide and a carbonaceous pyropolymer formed thereon, said conducting material having a conductivity at room temperature of from about $10^0$ to about $10^2$ inverse ohm-centimeters and is formed by reacting an organic pyrolyzable substance in the presence of a refractory oxide in a non-oxidizing atmosphere at a temperature of at least 400°C.

5 Claims, No Drawings

CONDUCTING MATERIAL FOR CONDUCTING DEVICES AND METHOD FOR FORMING THE SAME

CROSS-REFERENCE TO RELATED APPLICATIONS

This application is a continuation-in-part of our copending application Ser. No. 226,035 filed Feb. 14, 1972, which is a continuation-in-part of copending application Ser. No. 66,521 filed Aug. 21, 1970 and now U.S. Pat. No. 3,651,386 issued Mar. 21, 1972. The material set forth in the above-identified applications is incorporated herein by reference thereto.

BACKGROUND OF THE INVENTION

Heretofore semi-conducting materials which are useful in the electrical field have been prepared by various methods. For example, it is known in the prior art to prepare a semi-conducting material by impregnating a ceramic material with a solution of a carbonaceous decomposable material such as sugar in the presence of a solvent, the boiling point of said solvent, one example of which being glycerol, is substantially above the decomposition temperature of the carbonaceous decomposable material. After decomposition of the carbonaceous material by heat, the solvent is thereafter removed by an additional heat treatment and the porous ceramic body is further impregnated with a polymerizable resin which is thereafter polymerized to remove any remaining porosity. Another type of semi-conducting material which is known in the art is formed from polymeric aromatic compounds based on phthalaldehyde. These aromatic compounds are pyrolyzed at temperatures ranging from about 300° to about 1200° C. and preferably in a range of from 400° to 700° C. However, the semi-conducting materials which are obtained by the pyrolysis of these aromatic compounds, such as phthalaldehyde, possess conductivities which range from about $10^{-3}$ to about $10^{-10}$ inverse ohm-centimeters at a temperature of about 40° C. and a conductivity in the range of from about $10^{-1}$ to about $10^{-8}$ inverse ohm-centimeters at an elevated temperature of about 320° C. In contradistinction to this, it will be hereinafter shown in greater detail that it is possible to obtain semi-conducting materials comprising a carbonaceous pyropolymer formed on a refractory inorganic oxide which possesses certain physical characteristics whereby the semi-conducting material will possess a conductivity in the range of from about $10^0$ to about $10^2$ inverse ohm-centimeters.

It is known that hydrocarbons may be pyrolyzed to yield pyropolymers having various compositions. Pyrolysis is characterizied by heating a substance in the absence of oxygen in order to achieve a change in molecular structure. If pyrolysis of an organic pyrolyzable substance is carried to the extreme degree graphitic carbon will result. It has not heretofore been known, however, that heating a hydrocarbon or other organic pyrolyzable substance in the presence of an inorganic refractory oxide of high surface area will result in a material that is semiconducting at room temperature. This semiconducting material results from the formation of at least a monolayer of highly carbonaceous pyropolymers on the refractory oxide, and is the subject matter of this invention.

This invention relates to electrically conducting materials for use in conducting devices and to a method for preparing the same, wherein a conducting material is prepared which comprises a carbonaceous material formed on a refractory inorganic oxide which possesses a surface area within a range hereinafter set forth in greater detail. Conducting devices to which the conducting material may be used will include heterojunction transistors, field-effect transistors, thermoelements in thermoelectrical generators and refrigerators and temperature-sensing devices, resistors, charge and energy-storing devices, memory devices, inductive elements and a variety of other electrical applications.

It is known that hydrocarbons may be pyrolyzed to yield pyropolymers having various compositions. Pyrolysis is characterized by heating a substance in the absence of oxygen in order to achieve a change in molecular structure. If pyrolysis of an organic pyrolyzable substance is carried to the extreme degree, graphitic carbon will result. The degree of conductivity will depend upon the degree to which pyrolysis is carried out. Semi-conducting material will result when at least a monolayer of highly carbonaceous pyropolymer is formed on the refractory oxide.

It is therefore an object of this invention to economically produce a conducting material that may serve as an alternative to conventional materials in a number of conducting devices. Such applications include heterojunction transistors, field-effect transistors, thermoelements in thermoelectric generators and refrigerators and temperature-sensing devices, resistors, charge and energy-storage devices, memory devices, inductive elements, and a variety of other electrical applications.

The electrical conductivity of materials must fall into one of three categories: conductors, semi-conductors or insulators. Conductors are those materials generally recognized to have a conductivity greater than about $10^2$ inverse ohm-centimeters, while insulators have a conductivity no greater than about $10^{-10}$ inverse ohm-centimeters. Materials having a conductivity within these limits are considered to be semi-conducting materials.

Another object of the invention is to provide a manner of making conductive devices using base materials that are inexpensive and available in abundant supply. Furthermore, it is an object of this invention to provide for a method to make conducting devices that require only simple heating at relatively low temperature of the base materials together to produce the composition of conductive material used.

Another object is to produce a conducting device which can be manufactured from a wide variety of base or source materials. Heretofore, certain inorganic refractory oxides have been rendered at least semi-conducting at elevated temperatures, but the conducting properties of these materials are lost once the temperature is lowered because of their characteristic large activation energy for conduction.

In one aspect an embodiment of this invention resides in a semiconducting device, a semi-conducting material therefor comprising a refractory inorganic oxide having a surface area of from 25 to about 500 square meters per gram, and a carbonaceous pyropolymer formed thereon, said semi-conducting material having a conductivity at room temperature of from about $10^0$ to about $10^2$ inverse ohm-centimeters.

A specific embodiment of this invention relates to a semiconducting material comprising γ-alumina and a carbonaceous pyropolymer formed thereon, the carbonaceous pyropolymer having been formed by the pyrolysis of benzene at a temperature greater than 700° C., said semi-conducting material having a conductivity at room temperature of from about $10^0$ to about $10^2$ inverse ohm-centimeters.

Other objects and embodiments will be found in the following further detailed description of the present invention.

As hereinbefore set forth the present invention is concerned with a conducting material which is used in conducting devices and to a method for preparing the same. A conducting material for use in a conducting device entails the reaction of an organic pyrolyzable substance with a refractory oxide of a type hereinafter set forth in greater detail, the reaction taking place in a non-oxidizing atmosphere at a temperature of at least 400° C. In one embodiment of the invention, the inorganic refractory oxide may first be promoted by treatment with a catalytic metallic substance.

The considerable number of suitable alternative materials available for the method insures a consistently inexpensive supply of base materials without the danger of costly shortages in any particular component material. While conductivity within a range desired may be produced from a wide variety of base materials, specific conductivity and other electrical properties can be varied in a controlled manner to a large extent by pretreatment of the refractory oxide, by regulation of the pyrolyzing temperature, regulation of the length of time during which the basic components are heated, and by appropriate selection of the organic pyrolyzable substance used in this invention. In addition, the temperature required to produce the conducting material made according to this invention can be lowered considerably by pretreatment of the refractory oxide prior to contact with the organic pyrolyzable substance. While the above discussion relates to various parameters for preparing conductive materials which possess specific conductivities, it will be hereinafter shown in greater detail by utilizing certain parameters of temperature and time it is possible to obtain conducting materials which possess conductivities falling within a relatively narrow range, that is conductivities which range from about $10^0$ to about $10^2$ inverse ohm-centimeters.

One method which may be utilized in preparing the conducting materials of the present invention comprises placing a bed of refractory inorganic oxide in an appropriate vessel which may be formed of quartz or any other suitable material. The refractory inorganic oxide may be utilized in virtually any form, some of the many refractory inorganic oxides which may be rendered semi-conducting will include spheres, loose or compacted dry powders, cast or calcined sols, heated sols, sprayed substrates, oxidized aluminum pigment paint, insulating substances in the form of flats, cylinders and spheres, catalyst spheres, catalyst rods, catalyst pellets, conductors with refractory oxide coatings (sometimes taking the form of coated wires), insulators with refractory inorganic coatings (such as fibers), and a wide variety of geometrical configurations. The only limitation on the geometry of the refractory oxide is that it must be characterized as possessing a surface area of definite size, preferably the refractory inorganic oxide having a surface area of from about 25 to about 500 square meters per gram. Examples of refractory inorganic oxides which possess the desired surface area will include alumina ($Al_2O_3$), especially γ-alumina, silica ($SiO_2$) and silica-alumina ($Al_2O_3$-$SiO_2$), etc.

A multiplicity of the refractory inorganic oxide material which is used as a basic component for the semi-conducting material of the present invention are held in a bed which extends laterally across the vessel between two screens. A heat source such as a gas furnace is positioned around the vessel so as to heat the refractory inorganic oxide material and the incoming feed of the carbonaceous material upstream from the bed of the refractory inorganic oxide. In one embodiment, quartz chips may be positioned in the vessel atop the screen which is on top of the refractory inorganic oxide material, the chips acting as a feed preheater in the vessel. In the production of the conducting material, a feed stream comprising a pyrolyzable substance and a carrier gas is passed downward through the refractory inorganic oxide bed from an upstream inlet in the vessel. The organic pyrolyzable substance reacts with the refractory inorganic oxide material laying down a carbonaceous pyropolymer thereon. The vaporized products of the reaction are then passed out of the vessel through a downstream outlet. The carrier gas which is used to carry the organic pyrolyzable substance may be any inert or reducing gas such as nitrogen or hydrogen but may not be an oxidizing gas such as oxygen or air.

The chemical and electrical alteration of the base or source components in the production of the semi-conducting material of this invention may be explained as follows. In one method for producing conducting material, another central aspect of this invention, an organic pyrolyzable substance is cracked, reformed or pyrolyzed upon contact with the refractory inorganic oxide at an elevated temperature. The minimum temperature necessary is typically about 500° C. where only a refractory inorganic oxide is used, and typically about 400° C. where the refractory inorganic oxide is promoted or preimpregnated with a catalytic metallic substance. Such catalytic substances include all metals and mixtures of metals but especially the conventional hydrocarbon cracking catalytic metals such as platinum; platinum and rhenium; platinum and germanium; platinum and tin; platinum and lead; nickel and rhenium; nickel and tin; nickel and lead; nickel and germanium; etc. Whether or not a refractory inorganic oxide is promoted with a catalytic metallic substance, the refractory oxide is preferably heated to at least about 600° C. and preferably not above 700° C. to produce conducting materials having a conductivity ranging from about $10^{-8}$ to about $10^0$ inverse ohm-centimeters. By utilizing pyrolysis temperatures above about 700° C. and preferably in a range of from about 700° to about 1200° C. depending upon the organic pyrolyzable substance which is used, the conducting materials which are produced thereby will have conductivities ranging from about $10^0$ to about $10^2$ inverse ohm-centimeters. In addition to utilizing specific pyrolysis temperatures to produce conducting materials having a definite conductivity, it has also been found that the conductivity which is desired may be obtained by varying the time during which the process is effected, said time ranging from about 0.5 hour up to about 24 hours in duration.

The organic feed yields both volatile and non-volatile products. When the organic pyrolyzable substance is cyclohexane, for example, the major volatile product is usually benzene. Whatever the pyrolyzable substance, the non-volatile products remain on the hot refractory oxide as carbonaceous pyropolymers. The carbon percent of the pyropolymers by weight ranges from less than 9 percent to greater than 34 percent. The initial attack of the pyrolyzable substance is by active sites on the alumina surface.

The electrical conductivity of the refractory oxide and condensed pyropolymers is effected in three stages. In the first stage, the surface species of the refractory oxide react with the pyrolyzable substance to form acceptor-donor charge transfer complexes. The conductivity of the conductive material at this stage will depend on the ionization potential of the donor and the electron affinity of the acceptor, as well as on changes in polarization energy due to electron rearrangements. The conductivity increases markedly over a short period of time (less than 30 seconds) in the first phase of conductivity increase. During this phase the room temperature conductivity in still in the insulating range (less than $10^{-10}$ inverse ohm-centimeters.) However, at the termination of this first phase, the room temperature conductivity then is within the semiconducting range. That is, if after some critical treatment time the sample were allowed to cool to room temperature, its conductivity would not return to its original low value but would remain permanently increased. It is at this point in time that the refractory oxide is coated with at least a monolayer of carbonaceous pyropolymers. It is interesting to note that the sample becomes quite black after it has become permanently conducting. This is in contrast to the initial white or light color of refractory oxides. The black color alone, however, does not denote a pyropolymer monolayer on the refractory oxide.

The critical treatment time when the sample becomes semi-conducting at room temperature marks the onset of the second phase. This second phase is characterized by a relatively slow growth in the semi-conductivity, which further increases gradually two or three orders of magnitude, the color of the sample remaining black.

While the increased conductivity of the material in the first phase is due to charge-transfer complexes, the increase in conductivity in the second phase results from an increase in the size of the pyropolymer with an accompanying increase in the number of conjugated double bonds. When the size of a set of conjugated double bonds in the pyropolymer on the refractory oxide becomes larger than some number (about 10 to 10 double-bond pairs), then the pyropolymer molecule acquires unusual characteristics. The energy required for the formation of excited electron states in the molecule becomes so low that the population of electrons in excited states in thermodynamic equilibrium becomes appreciable at room temperature. This low ionization energy characteristic is dependent upon the degree of conjugation in the bonds of the carbonaceous pyropolymers. The number of conjugated double bonds in the pyropolymer formed on the refractory oxide surface when it is exposed to the organic pyrolyzable substance over a long period of time increases until a critical size in the pyropolymer is reached. This particular limiting size is dependent on the choices of pyrolyzable substance, treatment temperature, and ambient gas. Generally, the electrical conductivity of an organic solid rises as the degree of unsaturation increases. In unsaturation extends throughout the length of the material the conductivity of the material is generally high. Ionization energy drops as the degree of unsaturation increases because the electrons are no longer confined to any particular location. As the ionization energy decreases, more and more electrons become available for conduction. This increases the conductivity of the coated refractory oxide material. As the pyropolymers increase in size, the molecules become large enough for a good deal of long range order to develop. The ratio of hydrogen to carbon atoms in pyropolymers resulting from hydrocarbonaceous pyrolyzable substances also decreases due to the decrease in the ratio of peripheral carbons to interior carbons as the molecular size increases. This results in increased molecular orbital overlap and a lowering of the intermolecular potential barriers to charge transport with a consequent increase in the mobility of charge carriers. This condition of the material is represented by phase 3. Within phase 3 the intermolecular potential barrier to charge transport is significantly reduced, resulting in a further increase in conductivity. Within phase 3 the material will turn a relatively shiny metallic gray. The conductivity within this phase will have increased one or two orders of magnitude from the conductivity of phase 2. The shiny gray appearance characterizes the semi-conducting material in the condition represented by phase 3. When the desired conductivity is to be in a range of from about $10^0$ to about $10^2$ inverse ohm-centimeters, the temperature used is generally chosen to be over 700° C. and up to about 1200° C.

In summary then, the sharp initial rise in conductivity of the coated refractory oxide is likely due to carbonium ions reacting with the surface species to form thermally activated mobile charges. Formation of these charge carriers establishes an increase in the charge barrier density and results in enhanced conductivity. The quick response upon contacting a hot refractory oxide with an organic pyrolyzable substance indicates that the early increased conductivity is not due to the presence of a large quantity of pyropolymers. It follows, then, that a monolayer of carbonaceous pyropolymer molecules is not deposited on the refractory oxide surface until the material reaches the transition to the second phase. It is at the commencement of the second phase that the material first becomes conducting in the range of semi-conducting materials at room temperature. As the pyropolymers on the surface of the refractory oxide grow in size as well as number, free charge carriers are generated from within the pyropolymer molecules and persist even at room temperature. Continued heating in the presence of a pyrolyzable substance increases the number of free charge barriers, gradually increasing the electrical conductivity. As the material passes from the second phase to the third phase, intermolecular potential barriers to charge transport are lowered and both the mobility and the number of charge carriers is increased.

In developing a particular conducting material with a given refractory oxide, the conditions and reacting organic pyrolyzable substance can be varied so that different types of polymers exhibiting a variety of properties are formed. Pyrolyzation in this invention differs from conventional pyrolyzation in requiring a catalytically active refractory oxide having a surface area of from 25 to 500 square meters per gram. The refractory oxide serves the dual role of catalyzing the formation of the semi-conducting pyropolymer from the organic pyrolyzable substance and providing for the establishment of donor-acceptor charge-transfer complexes.

The conducting material of this invention differs from spent catalyst produced as an undesirable byproduct in hydrocarbon cracking and cracking of other organic compounds. For the same total carbon concentration, the conductivity of spent catalyst is considerably less than the conductivity of the semi-conducting material produced in acccordance with this invention. The reason for this is that the material of this invention has a considerably higher density of conjugated double bonds representing a substantially different structure. In conventional spent catalyst, conductivity rarely exceeds $10^{-8}$ inverse ohm-centimeters while conductivity of the semi-conducting material of the present invention seldom falls below $10^{-8}$ inverse ohm-centimeters.

Another electrical property that may be affected by the manner in which the conducting material of this invention is produced is the conductivity type. It has been observed that treating the carbonaceous pryopolymers at different temperatures results in different conductivity types for the same base material. Preimpregnating the refractory oxide with the proper inorganic salt causes the conductivity type of the completed semiconducting material to be n-type, whereas reacting the refractory oxide alone with most organic pyrolyzable substances will result in a conducting material that has p-type conductivity. One exception to the general rule that p-type conductivity is achieved where a refractory oxide alone is used is in a case where the organic pyrolyzable substance is benzene at 750° C. A semi-conducting material produced from the reaction of benzene and a refractory oxide at 750° C. will yield a semi-conducting material that is n-type.

The method as taught in the present invention may be directed to various conducting devices. For example, one such device is a semi-conducting thermoelement for a thermoelectric generator. The semi-conducting property of the material of this invention is particularly useful in this application due to the nature of a thermoelement in a thermoelectric generator. A thermoelement is maintained with a temperature difference between its ends. This temperature difference creates an electromotive force or voltage between the ends of the thermoelement. The thermoelectric power produced varies from at least 7 millivolts per °C. to as high as 70 millivolts per °C. and is as great or greater than the thermoelectric power of existing metallic thermoelements currently used. However, the semiconducting material of this invention has the added advantage of low thermal conductivity. That is, the thermal conductivity is no greater than about $2.50 \times 10^{-4}$ gram calories per second - $cm^2$ - °C. per cm. This facilitates the maintenance of a temperature difference between the ends of the thermoelement and thereby improves the efficiency of the thermoelectric generator.

The semiconducting material may be utilized as an electrode for an electrochemical cell and in such application comprises a carbonaceous pyropolymer consisting of at least a monolayer on a refractory oxide having a surface area of from about 1 to about 500 square meters per gram and having a conductivity at room temperature of from about $10^{-8}$ to about $10^0$ inverse ohm-centimeters. One form of such an electrode is gamma-alumina reacted with cyclohexane. Before reaction with cyclohexane, the gamma-alumina is impregnated with a small concentration of platinum from chloroplatinic acid. The concentration of platinum in the alumina is about 0.1 percent by weight. The impregnated alumina is treated with an organic pyrolyzable substance such as cyclohexane, hexane, or pentane, at a temperature of from between about 400°C. and 600°C. The electrode formed from this material may be used as a cathode in a galvanic cell that is further comprised of a copper anode in an electrolyte of sulfuric acid and water. A steady galvanic potential of 0.37 volts exists between the electrode of this invention and the copper anode. Additional cells may be constructed using a variety of electrodes and electrolytes in combination with the semiconducting material of this invention. Steady, characteristic potentials are recorded in each case. The semiconducting cathode in each case has the unusual characteristic of high surface area which allows an easy adaptation of the electrode of this invention for use in inexpensive energy conversion cells with higher cathodic exchange currents than have heretofore been obtained. As an alternative to preimpregnating the electrode described with platinum, metallic combinations such as lead, germanium, tin, platinum and tin, or platinum and rhenium may also be used for the purpose of preimpregnation.

Another device in which the conducting material of this invention may be utilized is in a field-effect transistor. An example of such a field-effect transistor may comprise a dielectric base having opposite surfaces, a metal coating being applied on one of the surfaces and a coating of a semi-conducting material in contact with the other of said surfaces. This coating of the semi-conducting material will comprise the type of the present invention in which a carbonaceous pyropolymer is formed in at least a monolayer or a refractory oxide having a surface of from about 25 to about 500 square meters per gram and it will possess a conductivity at room temperature of from about $10^{-8}$ to about $10^2$ inverse ohm-centimeters. The semi-conducting material may be normally formed on an inert laminar support such as a quartz sheet and the dielectric base is then laid over the semi-conducting material. The dielectric material is normally a conventional insulator constructed in a very thin sheet and having a high insulating capacity, one example of such a material being polyethylene terephthalate and known in the trade as Mylar. The catalytic coating is then laid down on the opposite side of the dielectric material so that the catalytic coating and the semi-conducting material which is prepared according to the process of this invention are positioned on opposite sides of the dielectric base to form a capacitor. If an electrical field of the proper polarity is placed across the dielectric by applying a voltage to the capacitor, the advantages of a field-effect device will be obtained. That is, a small fluctuation in voltage between a field electrode terminal connected to a metal coating and a first terminal on the semi-conducting material of the present invention on the opposite surfaces of the dielectric base will render a disproportionately large fluctuation in current between the first terminal on the semi-conducting material and a second terminal on the semi-conducting material of the present invention.

A physical property that may be imparted to the conducting material of this invention is a low coefficient of friction. This property is particularly useful in the construction of electrical switch contacts and motor generator brushes. The combined characteristics of high conductivity and low friction are particularly valuable in these applications. This combination of characteristics may be imparted to a semi-conducting material made according to this invention by compressing a powdered form of the conducting material of this invention with an inorganic dry lubricant. The conventional inorganic dry lubricants such as molybdenum disulfide and antimony oxide serve admirably for this purpose. A semi-conducting material produced according to this invention and powdered and compressed with an inorganic dry lubricant is superior to carbon in that it exhibits improved wear characteristics under heavy load cycles.

Further methods to which this invention can be utilized in conjunction therewith will be apparent since the material may be made to be pyroelectric, ferroelectric, and piezoelectric. One particular form of the semi-conducting material that is pyroelectric and ferroelectric is the semi-conducting material produced from γ-alumina preimpregnated with NaCl and reacted with cyclohexane. Some of the other forms of the semi-conducting material of this invention are also pyroelectric and ferroelectric. Since the material is pyroelectric, its electrical conductivity will be a function of a changing temperature gradient across the semi-conducting material of this invention.

Since the conducting material may be made ferroelectric, it exhibits spontaneous electric polarization, electric hysteresis, and piezoelectricity, that is, its electrical conductivity changes with variations in pressure exerted upon it. The ferroelectric properties of a semi-conducting material made according to the present method may be utilized in computer memory applications where the state of hysteresis of the polarization-voltage curve is used to indicate a state of "on" or "off" in the computer memory. Also, certain forms of the conducting material in the semi-conducting range of this invention can be made piezoelectric and may then be used in the form of a thin film integrated circuit inductive element. In those forms of the semi-conducting material which are piezoelectric, the semi-conducting material undergoes a change in conductivity when subjected to pressure. If the semi-conducting material is placed in a series resonant circuit and operated above its resonant frequency, it will behave as a inductor.

The organic pyrolyzable substances most commonly and preferably used for the purposes of this invention are members of the group consisting of aliphatic hydrocarbons, aliphatic halogen derivatives, aliphatic oxygen derivatives, aliphatic sulfur derivatives, aliphatic nitrogen derivatives, organo-metallic compounds, alicyclic compounds, aromatic compounds and heterocyclic compounds. Of the aliphatic hydrocarbons, the more common classes which may be utilized to perform this invention are alkanes, alkenes, alkynes, and alkadienes. Ethane, propane, butane and pentane are among the alkanes that may be successfully used in the performance of this invention. Similarly, alkenes which suffice include ethene, propene, 1-butene, 2-butene, and 1-pentene. Alkynes which may be successfully used include ethyne, propyne, 1-butyne, 2-butyne, 1-pentyne, and 1-hexyne. 1,3-butadiene and isoprene are included among the alkadienes which may be utilized. Among the aliphatic halogen derivatives which suffice for the purposes of this invention are monoalkanes, polyhaloalkanes, and unsaturated halo compounds. In the monoalkane subgroup, chloromethane, bromoethane, 1-iodopropane and 1-chlorobutane may be used. Polyhaloalkanes such as carbon tetrachloride may also be utilized. One unsaturated halo compound which may be utilized is chloroprene.

The aliphatic oxygen derivatives appropriate for use in this invention include the classes of alcohols, ethers, halohydrins and alkene oxides, saturated aldehydes and ketones, unsaturated aldehydes and ketones, ketenes, acids, salts, esters and carbohydrates. Various alcohols which may be utilized include ethanol, 2-butanol, 1-propanol, glycol, (e.g., 1,3-propanediol), and glycerol. Ethers utilized include ethyl ether and isopropyl ether. Appropriate halohydrins and alkene oxides include ethylene chlorohydrin, propylene chlorohydrin, ethylene oxide, and propylene oxide. Suitable saturated aldehydes and ketones include formaldehyde, acetaldehyde, acetone and ethyl methyl ketone. Unsaturated aldehydes and ketones which may be used include propenol, trans-2-butenal, and butenone. Ketene has also been successfully used as an organic pyrolyzable substance. Like-wise formic acid, acetic acid, oxalic acid, acrylic acid, chloroethanoic acid, formic anhydride and formylchloride may also be utilized. Esters such as methyl formate, ethyl formate, and ethyl acetate may also be used. Salts such as sodium formate, potassium acetate, and calcium propionate, may be utilized as may a variety of carbohydrates. The broad classification of aliphatic sulfur derivatives may be broken down into the subclasses of alkanethiols, alkylthioalkanes, sulfonic acids, and alkyl sulfates and alkyl metallic sulfates. Suitable among the alkanethiols are ethyl mercaptan and n-propyl mercaptan. Among the alkylthioalkanes usable are the thioethers, alkyl sulfides, methyl sulfide, ethyl sulfide, and methyl propyl sulfide. Ethyl sulfonic acid and n-propyl sulfonic acid are sulfonic acids which may also be successfully used. Ethyl sulfate and sodium laurel sulfate are also appropriate for use.

The broad class of aliphatic nitrogen derivatives may be broken down into the subclasses of nitroalkanes, amides, amines, nitriles and carbylamines. Nitroethane and 1-nitropropane are exemplary of suitable nitroalkanes while acetamide and propioamide are among the appropriate amides. Amines such as dimethylamine and ethylmethylamine, nitriles such as acetonitrile and propionitrile, and carbylamines such as ethyl isocyanid may also be used for the organic pyrolyzable substance in this invention. Organo-metallic compounds such as tetraisopropyl titanate, tetrabutyl titanate, and 2-ethylhexyl titanate may also be used.

Particularly appropriate and preferred for use as the organic pyrolyzable substance of this invention are the alicyclic compounds. Foremost among these are cyclohexane and cyclohexene. Aromatic compounds include the subclasses of hydrocarbons, halogen compounds, oxygen derivatives, ethers, aldehydes, ketones, quinones, aromatic acids, aromatic sulfur derivatives, and aromatic nitrogen compounds may also be utilized. Among the many suitable hydrocarbons, benzene, naphthalene, anthracene and toluene were successfully utilized. Benzyl chloride and benzal chloride are appropriate halogen compounds while phenol, o-cresol, benzyl alcohol, and hydroquinone are among the suitable derivatives. Ethers such as anisole and phenetole and aldehydes, ketones and quinones, such as benzaldehyde, acetophenone, benzophenone, benzoquinone, and anthraquinone may also be used. Aromatic acids such as benzoic acid, phenylacetic acid, and hydrocinnamic acid may be utilized while the aromatic sulfur derivative of benzenesulfonic acid will also serve successfully. The aromatic nitrogen compounds of nitrobenzene, 1-d-nitronaphthalene, aminobenzene and 2-aminotoluene may also be successfully used as the organic pyrolyzable substance of this invention. Among the heterocyclic compounds, five member ring compounds such as furan, proline, coumarone, thionaphthene, indole, indigo, and carbazole may be successfully utilized. Six member ring compounds, such as pyran, coumarin and acridine may also be utilized.

As can be seen, an extremely wide latitude can be exercised in the selection of the organic pyrolyzable substance, since virtually any organic material that can be vaporized, decomposed and polymerized on the refractory oxide by heating will suffice.

It has been found that the specific carbon concentration corresponding to a particular conductivity is a function of the pyrolyzable substance used to build the carbonaceous pyropolymer. For example, a carbon concentration of 31.7 percent in the propolymer produced at 700° C. from cyclohexane results in a conductivity of about $4 \times 10^{-3}$ inverse ohm-centimeters, while a carbon concentration of 21.1 percent in the propolymer produced at 700° C. from benzene results in a conductivity of about $4 \times 10^{-2}$ inverse ohm-centimeters. Likewise a carbon concentration of 28.5 percent in a pyropolymer produced from benzene which has been pyrolyzed at a temperature of 900° C. will result in a conductivity of about $1.2 \times 10^2$ inverse ohm-centimeters. This indicates a difference in the pyropolymer structure as between the pyropolymers produced from different pyrolyzable substances. This difference is due to organic residues not included in the extended, conjugated, double-bond structure. Such a difference indicates that extraneous carbon structures may be eliminated from the pyropolymer by a proper choice of starting materials. One particularly advantageous choice is a mixture of benzene and o-xylene. Demethylation of the xylene to produce the benzyl radical or diradical promotes the formation of large aromatic polynuclear networks without extraneous, non-conjugated network elements by providing a large concentration of nucleation radicals. This results in an organic semi-conducting material having a high conductivity with a relatively low carbon concentration. Similar results can be achieved using mixtures of o-xylene and naphthalene, o-xylene and anthracene, and halogenated or dihalogenated benzene and benzene, naphthalene, or anthracene.

The manufacture of the semi-conducting material of this invention may be illustrated more fully by the accompanying examples.

EXAMPLE I

Twenty-five cubic centimeters of γ-alumina were impregnated with a small concentration of platinum from chloroplatinic acid. The γ-alumina was placed in the chloroplatinic acid and the chloroplatinic acid was evaporated leaving a deposit of about 0.75 percent platinum salt by weight on the γ-alumina. The preimpregnated γ-alumina was positioned in a reactor vessel, the temperature of the reactor vessel was raised to 605° C. and the sample was reduced in one atmosphere of hydrogen for 2 hours. The carrier gas was then changed to nitrogen and cyclohexane was mixed with the carrier gas so that 0.4 cubic centimeters of cyclohexane for each cubic centimeter of preimpregnated γ-alumina was passed through the reactor per hour. The effluent flow rate was between 30 and 35 cubic centimeters per minute. The effluent flow rate and temperature were maintained for a total of 20 hours. At this time the semi-conducting material was removed from the reactor vessel and cooled.

The conductivity of the resulting product was between $10^{-2}$ and $10^{-3}$ inverse ohm-centimeters. The carbon concentration in the pyropolymer formed on the surface of the γ-alumina was about 20.8 percent by weight.

EXAMPLE II

The steps of Example I are repeated but pyridine is substituted for cyclohexane. In addition, the temperature of the reactor vessel is maintained at only 500° C., but the ratio of the volume of pyrolyzable material to the volume of refractory oxide is increased to 7. The conductivity of the resulting semi-conducting material is about $10^{-3}$ inverse ohm-centimeters.

EXAMPLE III

The steps of Example I are repeated but n-pentane is substituted for cyclohexane and is passed through the γ-alumina at a rate of 7 cubic centimeters of n-pentane for each cubic centimeter of impregnated γ-alumina. The temperature of the reactor vessel is raised to 700° C., but the resulting semi-conducting material is removed from the reactor and cooled after about 5 hours of exposure to the pyrolyzable material. The conductivity of the semi-conducting material produced is about $10^{-2}$ inverse ohm-centimeters.

EXAMPLE IV

Small spheres comprised of γ-alumina are positioned in a reactor vessel and benzene is used as the organic pyrolyzing substance. The benzene is injected into an inert carrier gas, nitrogen, so that 1 cubic centimeter of benzene for every cubic centimeter of γ-alumina is passed through the reactor vessel per hour. The γ-alumina is then heated to 600° C. The temperature and effluent flow rate are maintained for a total of 20 hours. Thereafter, the semi-conducting material is removed from the reactor vessel, cooled, and its conductivity is measured at ambient room temperature. The conductivity of the semi-conducting material produced is about 1 inverse ohm-centimeter. This compares to a conductivity of $10^{-16}$ inverse ohm-centimeters of untreated γ-alumina at 25° C.

EXAMPLE V

The steps of Example IV are repeated with several variations. Cyclohexane is substituted for the benzene of Example IV and the γ-alumina is heated to a temperature of 750° C. The semi-conducting material produced in this instance has a conductivity of about $10^{-1}$ inverse ohm-centimeters.

EXAMPLE VI

The steps of Example V are repeated with the exception that ethene is used in place of cyclohexane. The conductivity of the semi-conducting material produced is comparable to that of Example IV.

EXAMPLE VII

The steps of Example V are repeated with the exception that carbon tetrachloride is used in place of cyclohexane. The conductivity of the resulting semiconducting material product is comparable to that of Example IV.

EXAMPLE VIII

A quantity of γ-alumina is preimpregnated with sodium chloride by washing the γ-alumina in a salt solution. The γ-alumina is removed from the solution and is calcined at a temperature of about 200° C. to drive off the excess water. The γ-alumina is positioned in a reactor vessel and is exposed to cyclohexane in a helium carrier. The cyclohexane is passed over the γ-alumina for about 30 hours at a temperature of 600° C. The resulting product is an n-type semi-conducting material having a conductivity of about $10^{-4}$ inverse ohm-centimeters. In addition, this material exhibits the property of being strongly pyroelectric.

EXAMPLE IX

In this example small spheres of silica-alumina are treated with cyclohexane which is used as the organic pyrolyzing substance and is mixed to form an effluent with an inert carrier gas, nitrogen, so that 1 cubic centimeter of cyclohexane for every cubic centimeter of silica-alumina is passed through the reactor vessel per hour. The silica-alumina is heated to 650° C. The temperature and effluent flow rate are maintained for a total of 20 hours. Thereafter, the semi-conducting material is removed from the reactor vessel, cooled, and its conductivity is measured at approximately $10^{-4}$ inverse ohm-centimeters.

EXAMPLE X

The steps of Example IX are repeated with the exception that ethanol is used in place of cyclohexane. The conductivity of the resulting semi-conducting material produced is somewhat less than that of Example VIII, but still greater than $10^{-8}$ inverse ohm-centimeters.

EXAMPLE XI

The steps of Example X are repeated with methyl propyl sulfide used in place of the ethanol.

EXAMPLE XII

In this example the refractory oxide material consists of faujasite. A carbonaceous pyropolymer is formed on a faujasite and the resulting material is made semiconducting by exposing the faujasite to cyclohexane gas in a helium carrier at a rate of 1 cubic centimeter of cyclohexane for every cubic centimeter of faujasite at a temperature of 750° C. Exposure at this elevated temperature is maintained for about 20 hours. The semi-conducting material produced has a conductivity of $10^{-5}$ inverse ohm-centimeters at 25° C.

The illustrations and descriptions contained herein have been given for clearness of understanding only and no unnecessary limitations should be construed therefrom as other modifications will be obvious to those skilled in the field of semi-conducting materials and in the field of treatment of high surface refractory oxides.

EXAMPLE XIII

In this example 200 cc. of γ-alumina which has a particle size of 40–80 mesh was placed in a quartz reactor. The temperature of the reactor was raised to 900° C. and the γ-alumina was subjected to a flow of benzene feed and nitrogen at a rate of 1.1 cc. per minute of benzene and 30 cc. of nitrogen per minute. The effluent flow rate and temperature were maintained for a period of 4 hours, at the end of which time the feed was discontinued and the pyropolymer semi-conducting material was maintained in the heater for an additional period of 10 hours at 900° C. At the end of this time, the semi-conducting material was removed from the reactor vessel and allowed to cool.

The conductivity of the resulting product was $1.2 \times 10^2$ inverse ohm-centimeters and the carbon concentration in the pyropolymer which was formed on the surface of the γ-alumina was about 28.5% by weight.

EXAMPLE XIV

In a manner similar to that set forth in the above examples, 200 cc. of silica is placed in a quartz reactor and the temperature of the reactor is raised to 1100° C. At this time a feed consisting of cyclohexane in a nitrogen carrier gas is passed over the silica at a rate of about 30 cc. per minute. The feed of the cyclohexane in nitrogen is continued for a period of 4 hours at the end of which time the feed is discontinued and the semi-conducting material is maintained in the reactor for an additional period of 10 hours while maintaining the temperature at 1100° C. At the end of this time, heating is discontinued, the semi-conducting material is removed and will be found to have a conductivity between $10^0$ and $10^2$ inverse ohm-centimeters.

EXAMPLE XV

In like manner 200 cc. of a refractory oxide comprising a silica-alumina mixture is ground so that the particles will be in a range of 40–80 mesh. This material is then placed in a quartz reactor which is heated to a temperature of 900° C. and a feed consisting of a mixture of benzene in a nitrogen carrier gas is passed through the reactor at a rate of 35 cc. per minute. The effluent flow rate is continued for a period of 4 hours while maintaining the reactor at the aforementioned temperature of 900° C. At the end of the 4 hours, the feed rate is discontinued and the reactor is maintained at this temperature for an additional period of 10 hours. Following this, heating is discontinued, the semiconducting material is removed and allowed to cool. The conductivity of the resulting product will be between $10^0$ and $10^2$ inverse ohm-centimeters.

We claim as our invention:

1. In a semi-conducting device, a high surface area semi-conducting material therefor comprising a catalytically active high surface area refractory inorganic oxide having a surface area of from 25 to about 500 square meters per gram, and a carbonaceous pyropolymer forming at least a monolayer on said refractory oxide, said semi-conducting material having a conductivity at room temperature of from $10^0$ to about $10^2$ inverse ohm-centimeters.

2. The semi-conducting device as set forth in claim 1 in which said refractory inorganic oxide is an alumina.

3. The semi-conducting device as set forth in claim 2 in which said alumina is γ-alumina.

4. The semi-conducting device as set forth in claim 1 in which said refractory inorganic oxide is silica.

5. The semi-conducting device as set forth in claim 1 in which said refractory inorganic oxide is silica-alumina.

* * * * *